United States Patent
Tangler et al.

Patent Number: 5,562,420
Date of Patent: *Oct. 8, 1996

[54] AIRFOILS FOR WIND TURBINE

[75] Inventors: James L. Tangler, Boulder, Colo.; Dan M. Somers, State College, Pa.

[73] Assignee: Midwest Research Institute, Kansas City, Mo.

[*] Notice: The term of this patent shall not extend beyond the expiration date of Pat. No. 5,417,548.

[21] Appl. No.: 209,250

[22] Filed: Mar. 14, 1994

[51] Int. Cl.⁶ .................................................. B63H 1/26
[52] U.S. Cl. ............................... 416/223 R; 416/DIG. 2; 416/DIG. 5
[58] Field of Search ............................... 416/223 R, 228, 416/228 A, 242, 243, DIG. 2, DIG. 5

[56] References Cited

U.S. PATENT DOCUMENTS

| | | | |
|---|---|---|---|
| 3,173,490 | 3/1965 | Stuart, III | 416/223 R |
| 4,408,958 | 10/1983 | Schale | 416/237 |
| 4,459,083 | 7/1984 | Bingham . | |
| 4,606,519 | 8/1986 | Fertis et al. . | |
| 4,619,423 | 10/1986 | Holmes et al. . | |
| 4,668,169 | 5/1987 | Perry | 416/228 |
| 4,732,542 | 3/1988 | Hahn et al. . | |
| 4,830,315 | 5/1989 | Presz, Jr. et al. . | |
| 4,830,574 | 5/1989 | Wainauski et al. . | |
| 4,844,698 | 7/1989 | Gornstein et al. | 416/242 |
| 4,927,330 | 5/1990 | Asboth | 416/223 R |
| 4,941,803 | 7/1990 | Wainauski et al. . | |
| 4,976,587 | 12/1990 | Johnston et al. | 416/230 |
| 5,114,099 | 5/1992 | Gao . | |
| 5,161,952 | 11/1992 | Eggers, Jr. | 416/223 R |
| 5,417,548 | 5/1995 | Tangler et al. | 416/223 R |

FOREIGN PATENT DOCUMENTS

| | | | |
|---|---|---|---|
| 8503110 | 7/1985 | WIPO | 416/DIG. 2 |

OTHER PUBLICATIONS

Timmer, W. A. and van Rooy, R.P.J.O.M., J. of Wind Engineering and Industrial Aerodynamics, 39 (1992) pp. 151–160.

Primary Examiner—Edward K. Look
Assistant Examiner—Christopher Verdier
Attorney, Agent, or Firm—Edna M. O'Connor

[57] ABSTRACT

Airfoils for the blade of a wind turbine wherein each airfoil is characterized by a thickness in a range from 16%–24% and a maximum lift coefficient designed to be largely insensitive to roughness effects. The airfoils include a family of airfoils for a blade 15 to 25 meters in length, a family of airfoils for a blade 1 to 5 meters in length, and a family of airfoils for a blade 5 to 10 meters in length.

37 Claims, 4 Drawing Sheets

AIRFOILS FOR WIND TURBINE

CONTRACTUAL ORIGIN OF THE INVENTION

The United States Government has rights in this invention under Contract No. DE-AC02- 83CH10093 between the U.S. Department of Energy and the National Renewable Energy Laboratory, a Division of Midwest Research Institute.

BACKGROUND OF THE INVENTION

This invention relates to the field of wind turbines and specifically to a family of airfoils for use the blade of such a turbine.

In the past, conventional aircraft airfoil designs have been used in wind turbines. Such aircraft airfoil designs have created problems with the turbines. For clean blade conditions, these airfoils result in excessive power in high winds (which leads to burned-out generators). To avoid this problem, blades have been pitched more toward stall to reduce peak power which results in poor rotor power-to-thrust ratios and high wind-farm array losses. To overcome excessive peak power, the instant invention utilizes a tip region, outboard region and root region airfoil designed to restrain or reduce the maximum lift coefficient.

Another problem with such conventional aircraft airfoils, which has been specifically addressed by the instant invention, occurs when the blades produce inadequate energy output due to the blades becoming soiled with insect accumulation and airborne pollutants. The soiling of the blades creates airfoil roughness which affects the airfoil maximum lift coefficient and the desired output. In aircraft, such roughness is not of major concern since aircraft typically fly in clean air at high altitudes and have scheduled cleanings, but in wind turbines such cleaning is expensive and often difficult.

In the past, airfoils for wind turbine blades have been very susceptible to the effects of roughness. The instant invention is concerned width an improved family of airfoils for the blade of a horizontal-axis wind turbine, wherein the airfoil's maximum lift coefficient is designed to be largely insensitive to leading edge roughness.

An airfoil for the rotor blades of wind turbines is disclosed in U.S. Pat. No. 4,732,542 to Hahn et al. The patent, however, is directed to particular construction techniques, and not to an aeronautical design to minimize roughness of effects.

Two airfoils for turboprop aircraft are disclosed in U.S. Pat. No. 4,941,803 and 4,830,574 to Wainauski et al. Notably, the patents contemplate the use of the blades in a prop fan but not in a wind turbine. The airfoils of the patents are generally thinner with a thickness range of only 2% to 20% along the blade, whereas the range for the instant invention is 16%–24%. The airfoils of the patents were designed for high Math numbers and high blade solidity. Also, the maximum lift coefficients for the Wainauski et al. patents were not designed to be insensitive to roughness effects. Both patents, also, discuss foreign body damage, but not roughness effects. Thus they are more concerned with damage of the leading edge rather than the accumulation of insects and airborne contaminants. Again, cleaning processes associated with aircraft and operation in clean air minimize roughness concerns, whereas such cleaning is expensive and surface contamination prior to cleaning affect total energy output, for wind turbines.

U.S. Pat. No. 4,606,519 to Fertis et al. is directed to an airfoil having an offset in the upper surface. The airfoil is so designed to improve the lift and stall characteristics of the wing at high, cruising airspeeds, without substantially increasing the drag. Minimizing roughness sensitivity is not a concern of the patent. The instant invention, in contrast, contemplates a smooth suction surface without the discrete step or offset feature of the patent.

Roughness effects are also not discussed in U.S. Pat. No. 4,459,083 to Bingham. This patent is specifically directed to airfoils for rotor type aircraft and as such is directed to different concerns. The airfoil of this patent is specifically designed to reduce compressibility effects and provide a high drag divergence Mach number. The airfoils of the instant invention, in contrast, were not designed to have either of these features.

Laminar flow over an airfoil is the concern of U.S. Pat. No. 4,619,423 to Holmes et al. Specifically, the patent is concerned with shaping the interface mechanism at the juncture of the leading edge structure with both the upper and lower main wing skin panels, to allow laminar flow to occur over both the upper and lower surfaces of the airfoil. Thus the patent uses passive geometric interface devices to help maintain laminar flow over a discontinuity in the airfoil surface. However, maintaining laminar flow by shaping an interface mechanism is not a concern nor a design requirement for the airfoils of the instant invention.

The airfoil of U.S. Pat. No. 4,830,315 to Presz, Jr., has a relatively thin trailing edge with a series of troughs and ridges to form wave-like surface undulations. Again, the patent to Presy, Jr. et al. is not concerned with roughness created by insects and airborne contaminants. It is further noted that roughness is generally more pronounced on the leading edge of the airfoil, whereas the patent is concerned with trailing edge geometry to delay boundary layer separation without creating a noticeable drag penalty.

A non-smooth surface shape is disclosed in U.S. Pat. No. 5,114,099 to Gao. In contrast, the surface of the instant invention is of the conventional, generally smooth, type. The surface shape of the patent attempts to reduce drag. Roughness and its effects are not the concern of the patent.

In summary, none of the above cited patents specifically deal with an airfoil design to minimize roughness sensitivity, except for U.S. Pat. No. 4,619,423. That patent, however, is concerned with an interface mechanism to help maintain laminar flow over the airfoil surface.

SUMMARY OF THE INVENTION

It is an object of the instant invention to overcome excessive peak power by utilizing airfoils designed to reduce or restrain the maximum lift coefficient and to decrease blade cleaning requirements and minimize energy losses even when the blades become soiled with insect accumulation or airborne contaminants.

The primary goal of new wind turbine blade designs is to convert the kinetic energy in the wind into mechanical energy as inexpensively and efficiently as possible. Any disruptions in the efficient operations of a wind turbine affect the total energy output. Thus, early generator replacement from excessive peak power and cleaning the large-sized wind turbine blades can be expensive to perform.

The blades of horizontal-axis wind turbines typically become coated with insect accumulation and airborne contaminants. This collection of dirt, called roughness, predominantly happens at the leading edge of the blade. The roughness can interrupt the efficient operation of the blades, and diminish their overall energy output.

The instant invention is directed to several families of airfoils for the blades of a wind turbine, and the airfoils are designed to have a maximum lift coefficient that is less sensitive to roughness effects. The blades range in length from 1–25 meters.

The airfoils range from 16% (tip region)–24% (root region) thickness, with thickness being defined by the airfoil depth perpendicular to the chord line divided by the cord line length, and are used in a blade having a length from 1 to 25 meters. The airfoils are designed with a Reynolds number in the range from 400,000 (root region) to 4,000,000 (outboard region), with a maximum lift coefficient of 1.0 (tip region) to 1.7 (root region).

DETAILED DESCRIPTION OF THE PREFERRED EMBODIMENT

Figure 1:
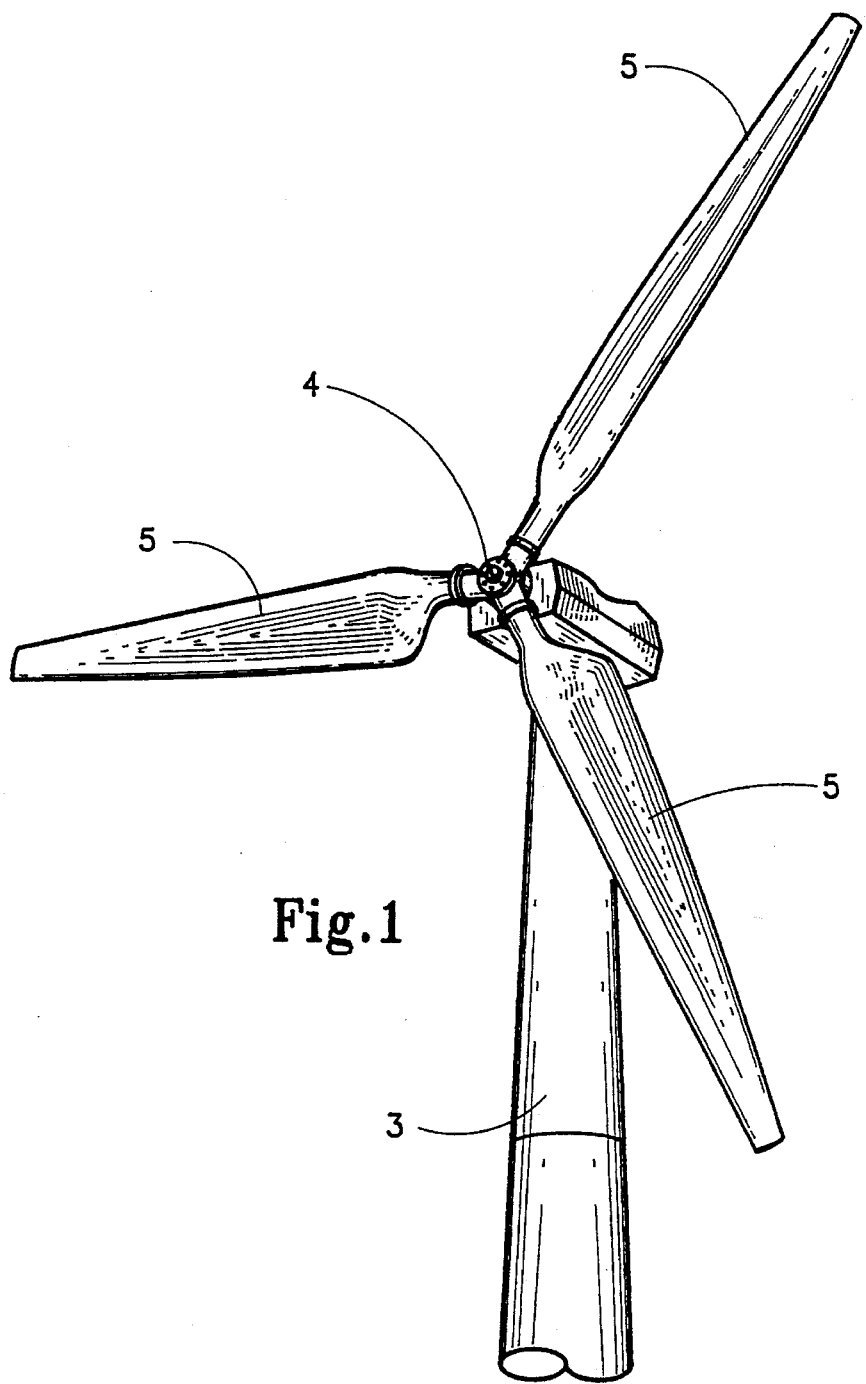
FIG. 1 is a perspective of a horizontal axis wind turbine that can incorporate the instant invention.

FIG. 1 shows a typical stall-regulated horizontal-axis wind turbine. Blades 5 rotate about center horizontal-axis shaft 4, having a center axis of rotation and the entire rotor mechanism is supported by support tower 3.

Figure 2:
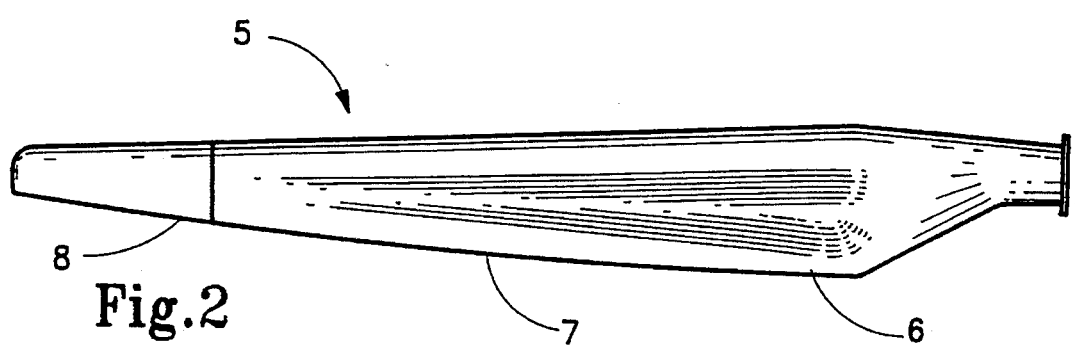
FIG. 2 is a perspective of a blade that incorporates the airfoils of the instant invention.

The instant invention is particularly concerned with blades for such a wind turbine. A perspective of the blade is shown in FIG. 2. The blades are typically made of either fiberglass or wood composite. The blades containing the airfoils of the subject invention range in size from 1 to 25 meters to form a rotor which can be as large as 50 meters in diameter.

Blades typically have performance characteristics that are tailored to change from the blade tip 8, (80%–100% radius from lie center of rotation) to the blade outboard region 7, (50%–80% from the center of rotation), to the root region 6 (up to 50% radius from the center of rotation). Effectively the root region is considered to be the region from 20% to 50% from the center of rotation.

To control peak rotor power of constant rpm rotors in high winds, the airfoil in the tip region of the blade must have a maximum lift coefficient flint is 25% to 40% lower than typical aircraft airfoils. However, an airfoil in the root region of the blade must have a high maximum lift coefficient to aid rotor start-up and energy production at medium wind speeds. The airfoil families of the instant invention are incorporated in a blade whose maximum lift coefficient increases in a continuous manner from blade tip to blade root for effective peak power control. This results in approximately a 15%–30% greater swept disc area for a given generator size and results in increased energy production.

All three airfoil families of the present invention are designed to have the maximum lift coefficient be less sensitive to roughness effects. To achieve roughness insensitivity, the airfoil's shape is geometrically tailored to induce transition from laminar to turbulent flow near the leading edge of the airfoil as the maximum lift coefficient is approached.

Figure 3:
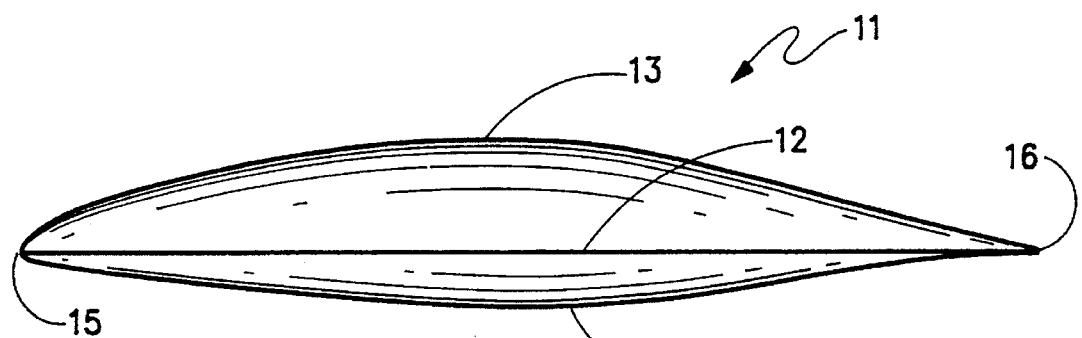
FIG. 3 is a profile of a first family airfoil for the tip region of a blade 15 to 25 meters in size, in accordance with the instant invention.
Figure 4:
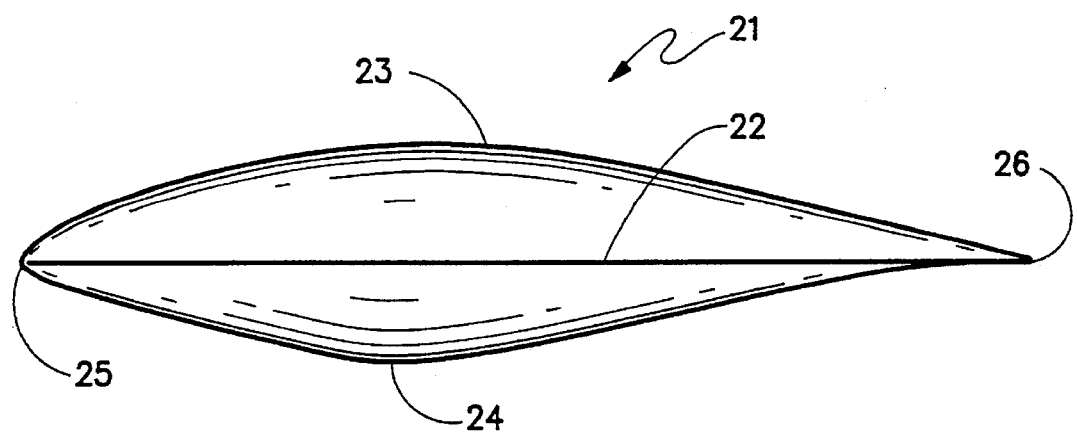
FIG. 4 is a profile of a first family airfoil for the outboard region of a blade 15 to 25 meters in size, in accordance with the instant invention.
Figure 5:
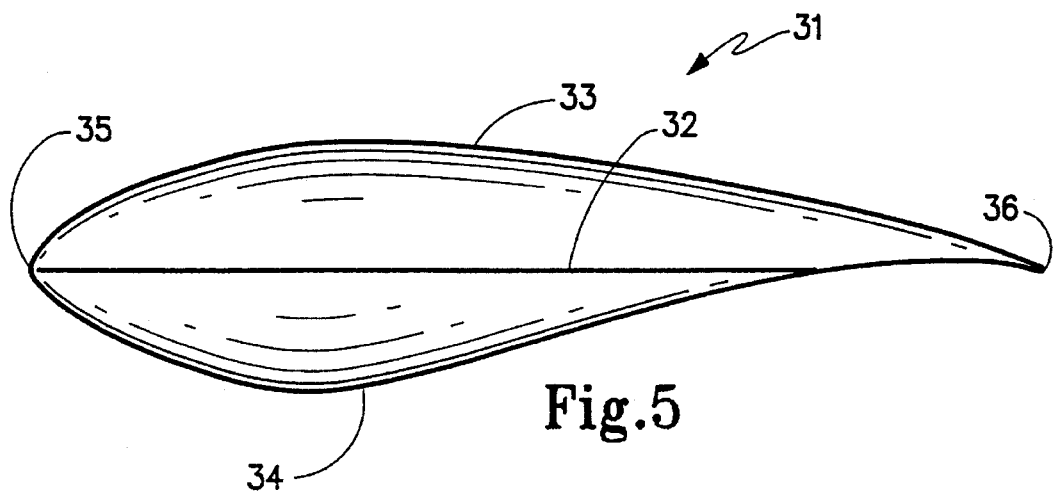
FIG. 5 is a profile of a first family airfoil for the root region of a blade 15 to 25 meters in size, in accordance with the instant invention.

The first family of airfoils which are for a blade 15 to 25 meters in length are illustrated FIGS. 3 through 5.

FIG. 3 is a profile of a tip airfoil 11 in accordance with the instant invention. The airfoil has specific geometric tailoring to achieve a maximum lift coefficient of 1.1 at a Reynolds number of 3,000,000. This maximum lift coefficient will be largely insensitive to roughness effects.

The upper surface of the airfoil is shown at 13 and the lower surface at 14. The leading edge is at 15 and the trailing edge at 16. The airfoil has a thickness of 16%.

The specific geometric tailoring of the airfoil 11 of FIG. 3 is given in the form of the following table of coordinates. The x/c values are dimensionless locations on the blade chord line 12. They are given for both the upper and lower surfaces. The y/c values are the dimensionless heights from the chord line 12 to points either on the upper or lower surface.

| Upper Surface | | Lower Surface | |
| --- | --- | --- | --- |
| x/c | y/c | x/c | y/c |
| 0.00010 | 0.00117 | 0.00001 | −0.00038 |
| .00036 | .00243 | .00029 | −.00169 |
| .00443 | .01001 | .00107 | −.00285 |
| .01313 | .01841 | .00235 | −.00398 |
| .02661 | .02719 | .00925 | −.00755 |
| .04479 | .03620 | .02330 | −.01157 |
| .06748 | .04533 | .04329 | −.01517 |
| .09441 | .05445 | .06911 | −.01857 |
| .12517 | .06342 | .10030 | −.02217 |
| .15941 | .07203 | .13611 | −.02613 |
| .19672 | .09010 | .17584 | −.03033 |
| .23667 | .08746 | .21884 | −.03464 |
| .27883 | .09392 | .26447 | −.03891 |
| .32273 | .09934 | .31211 | −.04294 |
| .36790 | .10355 | .36113 | −.04655 |
| .41384 | .10640 | .41092 | −.04952 |
| .46005 | .10771 | .46088 | −.05162 |
| .50602 | .10727 | .51041 | −.05260 |
| .55134 | .10473 | .55893 | −.05200 |
| .59595 | .09969 | .60634 | −.04913 |
| .63994 | .09191 | .65317 | −.04392 |
| .69397 | .09192 | .69967 | −.03701 |
| .79779 | .07087 | .74564 | −.02924 |
| .77085 | .05960 | .79051 | −.02150 |
| .91221 | .04965 | .83342 | −.01447 |
| .95106 | .03842 | .87341 | −.00961 |

-continued

| Upper Surface | | Lower Surface | |
|---|---|---|---|
| x/c | y/c | x/c | y/c |
| .88653 | .02908 | .90948 | −.00420 |
| .91803 | .02060 | .94065 | −.00132 |
| .94528 | .01309 | .96599 | .00013 |
| .96792 | .00701 | .98470 | .00046 |
| .98522 | .00291 | .99615 | .00020 |
| .99621 | .00061 | 1.00000 | .00000 |
| 1.00000 | .00000 | | |

FIG. 4 is a profile of another airfoil for use in a blade 15 to 25 meters in length. This airfoil is designed for the outboard region of the blade, that is, the region from 50%–80% from the center of rotation. The airfoil has specific geometric tailoring to achieve a maximum lift coefficient of 1.2 at a Reynolds number of 4,000,000. This maximum lift coefficient will be largely insensitive to roughness effects.

The upper surface of the airfoil is shown at 23 and the lower surface at 24. The leading edge is at 25 and the trailing edge at 26. The airfoil has a thickness of 21%.

The specific geometric tailoring of the airfoil 21 of FIG. 4 is also given in the form of the following table of coordinates. The x/c values are dimensionless locations on the blade chord line 22. They are given for body the upper and lower surfaces. The y/c values are the dimensionless heights from the chord line 22 to points either on the upper or lower surface.

| Upper Surface | | Lower Surface | |
|---|---|---|---|
| x/c | y/c | x/c | y/c |
| 0.00000 | 0.00009 | 0.00019 | −0.00158 |
| .00023 | .00198 | .00093 | −.00314 |
| .00302 | .00863 | .00220 | −.00475 |
| .01099 | .01818 | .00368 | −.00620 |
| .02379 | .02836 | .01412 | −.01294 |
| .04125 | .03898 | .03050 | −.01988 |
| .06315 | .04950 | .05260 | −.02698 |
| .08920 | .06005 | .08019 | −.03456 |
| .11901 | .07033 | .11247 | −.04309 |
| .15222 | .08009 | .14831 | −.05249 |
| .18843 | .08912 | .18682 | −.06232 |
| .22723 | .09720 | .22730 | −.07231 |
| .26818 | .10411 | .26946 | −.09222 |
| .31082 | .10965 | .30881 | −.09050 |
| .35467 | .11360 | .34977 | −.09483 |
| .39923 | .11560 | .39005 | −.09470 |
| .44399 | .11547 | .43340 | −.09089 |
| .48900 | .11217 | .47990 | −.08411 |
| .53503 | .10591 | .52644 | −.07515 |
| .59217 | .09767 | .57555 | −.00477 |
| .62992 | .08924 | .62567 | −.05360 |
| .67730 | .07911 | .67615 | −.04229 |
| .72392 | .06774 | .72622 | −.03146 |
| .76893 | .05749 | .77501 | −.02165 |
| .81158 | .04763 | .92154 | −.01331 |
| .85113 | .03819 | .96477 | −.00676 |
| .88685 | .02976 | .90364 | −.00216 |
| .91827 | .02165 | .93713 | .00052 |
| .94534 | .01412 | .96426 | .00150 |
| .96794 | .00776 | .98412 | .00118 |
| .99512 | .00320 | .99605 | .00039 |
| .99617 | .00072 | 1.00000 | .00000 |
| 1.00000 | .00000 | | |

FIG. 5 is a profile of another first family airfoil in accordance with the instant invention. This airfoil is designed for a particular region, namely the root region of the blade. This region typically extends from 20%–50% from the center of rotation. The airfoil has specific geometric tailoring to achieve a maximum lift coefficient of 1.7 at a Reynolds number of 2,500,000. This maximum lift coefficient will also be largely insensitive to roughness effects.

The upper surface of the airfoil is shown at 33 and the lower surface at 34. The leading edge is at 35 and the trailing edge at 36. The airfoil has a thickness of 24%. The specific geometric tailoring of the airfoil 31 of FIG. 5 is also given in the form of the following table of coordinates. The x/c values are dimensionless locations on the blade chord line 32. They are given for both the upper and lower surfaces. The y/c values are the dimensionless heights from the chord line 32 to points either on the upper or lower surface.

| Upper Surface | | Lower Surface | |
|---|---|---|---|
| x/c | y/c | x/c | y/c |
| 0.00012 | 0.00170 | 0.00003 | −0.00087 |
| .00066 | .00442 | .00049 | −.00141 |
| .00374 | .01205 | .00141 | −.00009 |
| .01259 | .02417 | .00328 | −.00985 |
| .02619 | .03717 | .01232 | −.02157 |
| .04424 | .05009 | .02631 | −.03391 |
| .06647 | .06284 | .04486 | −.04650 |
| .09256 | .07518 | .06764 | −.05923 |
| .12213 | .09691 | .09404 | −.07200 |
| .15492 | .09745 | .12331 | −.08444 |
| .19023 | .10679 | .15489 | −.09599 |
| .22797 | .11449 | .18823 | −.10622 |
| .26760 | .12006 | .22239 | −.11444 |
| .30915 | .12285 | .25700 | −.11993 |
| .35312 | .12287 | .29323 | −.11947 |
| .39944 | .12073 | .33232 | −.11329 |
| .44760 | .11690 | .37489 | −.10412 |
| .49702 | .11165 | .42102 | −.09200 |
| .54711 | .10527 | .47043 | −.07786 |
| .59727 | .09799 | .52267 | −.06258 |
| .64695 | .09003 | .57709 | −.04706 |
| .69521 | .09161 | .63298 | −.03217 |
| .74169 | .07292 | .69903 | −.01872 |
| .78569 | .06409 | .74437 | −.00740 |
| .82657 | .05526 | .79759 | .00129 |
| .86377 | .04651 | .84726 | .00704 |
| .89672 | .03779 | .99200 | .00985 |
| .92522 | .02895 | .93046 | .00996 |
| .94958 | .01993 | .96144 | .00780 |
| .96996 | .01155 | .99351 | .00422 |
| .98590 | .00509 | .99606 | .00113 |
| .99633 | .00122 | 1.00000 | .00000 |
| 1.00000 | .00000 | | |

Figure 6:
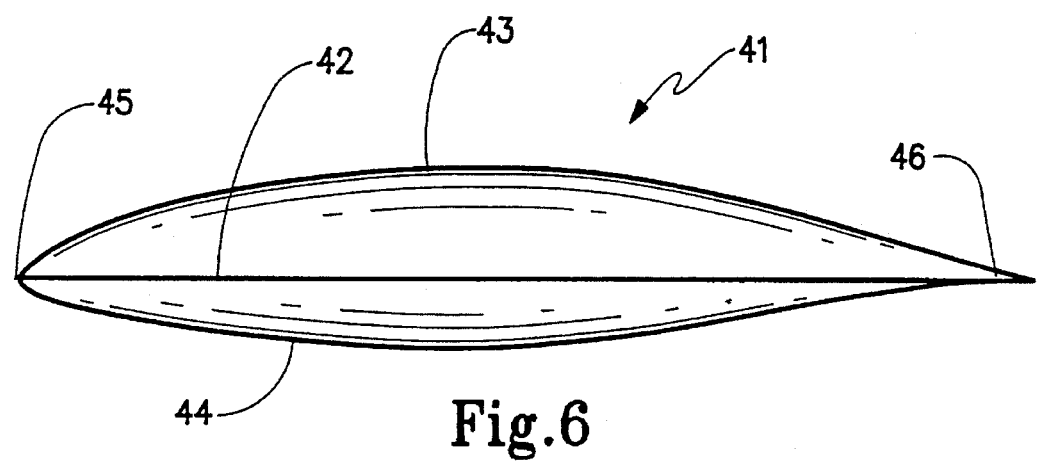
FIG. 6 is a profile of a second family airfoil for the tip region of a blade 5 to 10 meters in size, in accordance with the instant invention.
Figure 7:
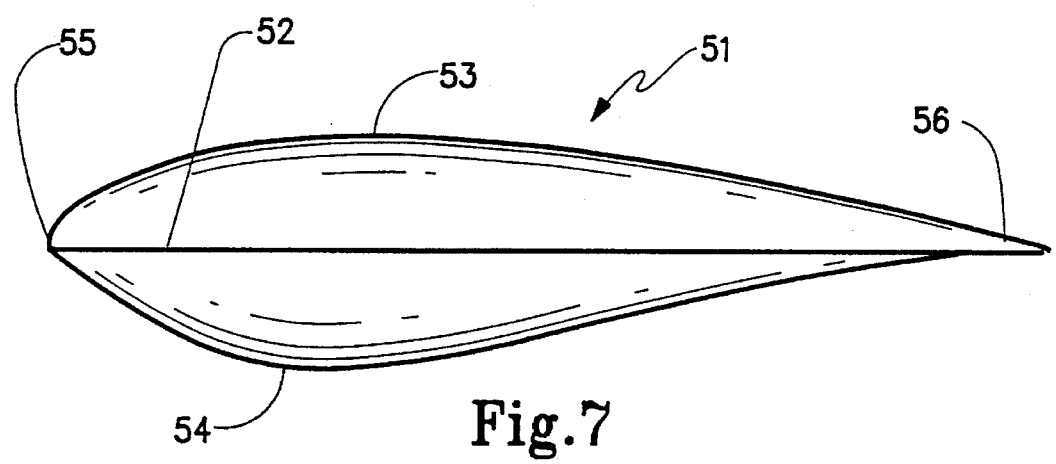
FIG. 7 is a profile of a second family airfoil for the outboard region of a blade 5 to 10 meters in size, in accordance with the instant invention.
Figure 8:
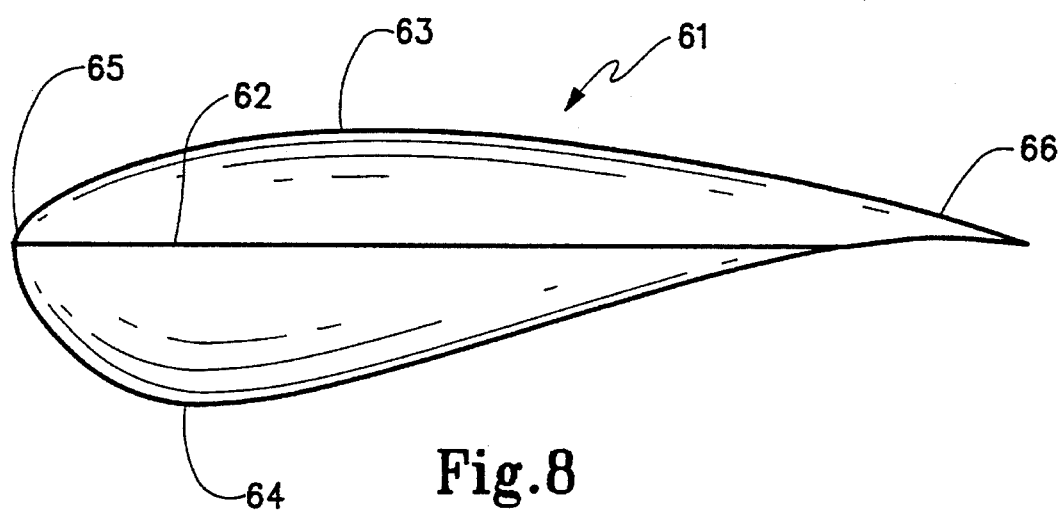
FIG. 8 is a profile of a second family airfoil for the root region of a blade 5 to 10 meters in size in accordance with the instant invention.

The second family of airfoils for a blade 5 to 10 meters in length is illustrated in FIGS. 6–8. FIG. 6 is a profile of a tip airfoil 41 in accordance with the instant invention. The airfoil has specific geometric tailoring to achieve a maximum lift coefficient of 1.1 at a Reynolds number of 1,300,000. This maximum lift coefficient will be largely insensitive to roughness effects.

The upper surface of the airfoil is shown at 43 and the lower surface at 44. The leading edge is at 45 and the trailing edge at 46. The airfoil has a thickness of 16%.

The specific geometric tailoring of the airfoil 41 of FIG. 6 are given in the form of the following table of coordinates. The x/c values are dimensionless locations on the blade chord line 42. They are given for both the upper and lower surfaces. The y/c values are the dimensionless heights from the chord line 42 to points either on the upper or lower surface.

| Upper Surface | | Lower Surface | |
|---|---|---|---|
| x/c | y/c | x/c | y/c |
| 0.00013 | 0.00133 | 0.00001 | −0.00041 |
| .00364 | .00910 | .00032 | −.00178 |
| .01172 | .01811 | .00117 | −.00300 |
| .02425 | .02759 | .00258 | −.00423 |
| .04120 | .03709 | .01207 | −.00946 |
| .06255 | .04637 | .02754 | −.01514 |
| .08815 | .05531 | .04834 | −.02097 |
| .11774 | .06379 | .07403 | −.02684 |
| .15102 | .07167 | .10419 | −.03260 |
| .18764 | .07894 | .13841 | −.03813 |
| .22719 | .08520 | .17622 | −.04330 |
| .26923 | .09063 | .21715 | −.04798 |
| .31330 | .09501 | .26072 | −.05203 |
| .35891 | .09825 | .30638 | −.05533 |
| .40555 | .10022 | .35360 | −.05772 |
| .45272 | .10079 | .40183 | −.05903 |
| .49999 | .09979 | .45050 | −.05900 |
| .54666 | .09689 | .49923 | −.05721 |
| .59300 | .09196 | .54907 | −.05340 |
| .63875 | .08519 | .59707 | −.04785 |
| .69373 | .07668 | .64604 | −.04093 |
| .72795 | .06688 | .69476 | −.03316 |
| .77109 | .05656 | .74277 | −.02532 |
| .81244 | .04635 | .78923 | −.01803 |
| .85123 | .03666 | .83325 | −.01172 |
| .88669 | .02775 | .87388 | −.00668 |
| .91819 | .01962 | .91020 | −.00304 |
| .94544 | .01242 | .94132 | −.00077 |
| .96806 | .00661 | .96644 | .00029 |
| .99531 | .00263 | .98490 | .00047 |
| .99624 | .00057 | .99620 | .00020 |
| 1.00000 | .00000 | 1.00000 | .00000 |

FIG. 7 is a profile of another airfoil 51 for use in a blade 5 to 10 meters in length. This airfoil is designed for the outboard region of the blade. That is, the region from 50%–80% from the center of rotation. The airfoil has specific geometric tailoring to achieve a maximum lift coefficient of 1.2 at Reynolds number of 1,000,000. This maximum lift coefficient will be largely insensitive to roughness effects.

The upper surface of the airfoil is shown at 53 and the lower surface at 54. The leading edge is at 55 and the trailing edge at 56. The airfoil has a thickness of 21%.

The specific geometric tailoring of the airfoil 51 of FIG. 7 is also given in the form of following table of coordinates. The x/c values are dimensionless locations on the blade chord line 52. They are given for both the upper and lower surfaces. The y/c values are the dimensionless heights from the chord line 52 to points either on the upper or lower surface.

| Upper Surface | | Lower Surface | |
|---|---|---|---|
| x/c | y/c | x/c | y/c |
| 0.00002 | 0.00077 | 0.00006 | −0.00125 |
| .00101 | .00556 | .00056 | −.00299 |
| .00673 | .01572 | .00177 | −.00455 |
| .01719 | .02663 | .00372 | −.00622 |
| .03213 | .03769 | .00891 | −.00986 |
| .05143 | .04852 | .02445 | −.02021 |
| .07486 | .05890 | .04415 | −.03323 |
| .10216 | .06858 | .06692 | −.04746 |
| .13302 | .07733 | .09234 | −.06201 |
| .16709 | .08491 | .11997 | −.07614 |
| .20399 | .09099 | .14948 | −.09914 |
| .24355 | .09516 | .18049 | −.10033 |
| .28581 | .09736 | .21265 | −.10864 |
| .33053 | .09777 | .24658 | −.11280 |
| .37732 | .09651 | .28355 | −.11294 |
| .42580 | .09369 | .32395 | −.10966 |
| .47552 | .08949 | .36718 | −.10375 |
| .52602 | .08411 | .41332 | −.09557 |
| .57678 | .07790 | .46199 | −.08562 |
| .62723 | .07078 | .51244 | −.07440 |
| .67679 | .06331 | .56446 | −.06247 |
| .72481 | .05561 | .61728 | −.05039 |
| .77067 | .04792 | .67018 | −.03869 |
| .81370 | .04039 | .72231 | −.02799 |
| .85327 | .03316 | .77274 | −.01843 |
| .88875 | .02622 | .82050 | −.01064 |
| .91979 | .01940 | .86454 | −.00473 |
| .94642 | .01282 | .90397 | −.00075 |
| .96851 | .00712 | .93753 | .00141 |
| .98545 | .00295 | .96464 | .00197 |
| .99626 | .00066 | .99437 | .00136 |
| 1.00000 | .00000 | .99613 | .00042 |
| | | 1.00000 | .00000 |

FIG. 8 is a profile of another second family airfoil 61 in accordance with the instant invention. This airfoil is designed for a particular region, namely the root region of the blade. This region typically extends from 20%–50% from the center of rotation. The airfoil has specific geometric tailoring to achieve a maximum lift coefficient of 1.4 at a Reynolds number of 800,000. This maximum lift coefficient will also be largely insensitive to roughness effects.

The upper surface of the airfoil is shown at 63 and the lower surface at 64. The leading edge is at 65 and the trailing edge at 66. The airfoil has a thickness of 24%.

The specific geometric tailoring of the airfoil 61 of FIG. 8 is also given in the form of the following table of coordinates. The x/c values are dimensionless locations on the blade chord line 62. They are given for both the upper and lower surfaces. The y/c values are the dimensionless heights from the chord line 62 to points either on the upper or lower surface.

| Upper Surface | | Lower Surface | |
|---|---|---|---|
| x/c | y/c | x/c | y/c |
| 0.00004 | 0.00203 | .00001 | −.00076 |
| .00037 | .00550 | .00243 | −.01654 |
| .00110 | .00874 | .00887 | −.03393 |
| .00234 | .01186 | .01876 | −.05219 |
| .00405 | .01499 | .03170 | −.07058 |
| .01212 | .02520 | .04745 | −.08838 |
| .02684 | .03773 | .06576 | −.10493 |
| .04636 | .04980 | .08643 | −.11944 |
| .07040 | .06118 | .10959 | −.13110 |
| .09865 | .07171 | .13548 | −.13943 |
| .13075 | .08122 | .16433 | −.14399 |
| .16633 | .08955 | .19663 | −.14462 |
| .20495 | .09652 | .23262 | −.14170 |
| .24618 | .10190 | .27216 | −.13552 |
| .28970 | .10538 | .31514 | −.12635 |
| .33539 | .10684 | .36142 | −.11455 |
| .38300 | .10642 | .41081 | −.10062 |
| .43214 | .10431 | .46300 | −.08518 |
| .49234 | .10066 | .51756 | −.06893 |
| .53312 | .09566 | .57389 | −.05266 |
| .58396 | .08955 | .63119 | −.03717 |
| .63429 | .08254 | .68850 | −.02322 |
| .68353 | .07489 | .74465 | −.01147 |
| .73105 | .06680 | .79836 | −.00239 |
| .77624 | .05851 | .84823 | .00376 |

-continued

| Upper Surface | | Lower Surface | |
|---|---|---|---|
| x/c | y/c | x/c | y/c |
| .81848 | .05016 | .89291 | .00700 |
| .85715 | .04192 | .93109 | .00763 |
| .89164 | .03377 | .96165 | .00615 |
| .92166 | .02552 | .98346 | .00340 |
| .94740 | .01733 | .99601 | .00093 |
| .96886 | .00996 | 1.00000 | .00000 |
| .98550 | .00432 | | |
| .99625 | .00102 | | |
| 1.00000 | .00000 | | |

Figure 9:
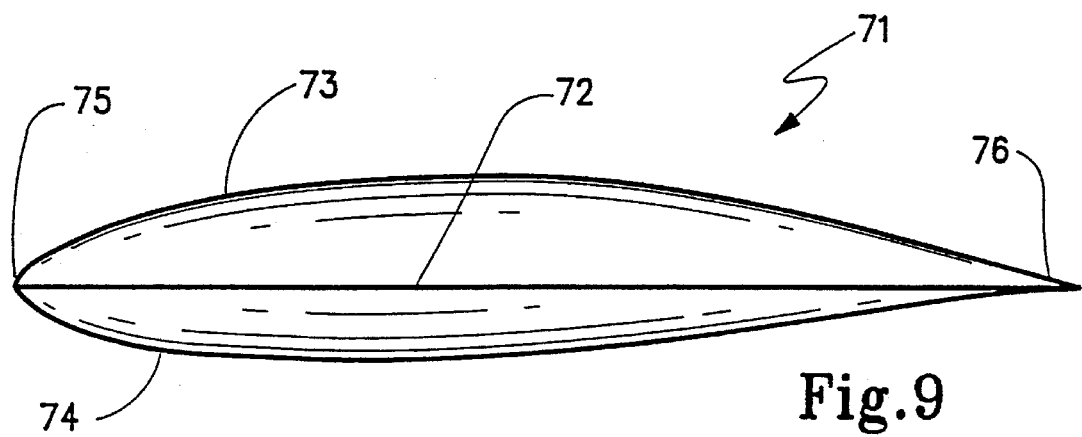
FIG. 9 is a profile of a third family airfoil for the tip region of a blade 1 to 5 meters in size in accordance with the instant invention.

The third family of airfoils are designed for a blade 1 to 5 meters in length. FIG. 9 is a profile of a tip airfoil 71 in accordance with the instant invention. The airfoil has specific geometric tailoring to achieve a maximum lift coefficient of 1.0 at a Reynolds number of 600,000. This maximum lift coefficient will be largely insensitive to roughness effects.

The upper surface of the airfoil is shown at 73 and the lower surface at 74. The leading edge is at 75 and the trailing edge at 76. The airfoil has a thickness of 16%.

The specific geometric characteristics of the airfoil 71 of FIG. 9 is given in the form of the following table of coordinates. The x/c values are dimensionless locations on the blade chord line 72. They are given for both the upper and lower surfaces. The y/c values are the dimensionless heights from the chord line 72 to points either on the upper or lower surface.

| Upper Surface | | Lower Surface | |
|---|---|---|---|
| x/c | y/c | x/c | y/c |
| 0.00012 | 0.00132 | 0.00002 | −0.00057 |
| .00064 | .00336 | .00042 | −.00244 |
| .00176 | .00603 | .00126 | −.00440 |
| .00861 | .01510 | .00530 | −.01010 |
| .02029 | .02464 | .01536 | −.01866 |
| .03661 | .03425 | .03019 | −.02713 |
| .05742 | .04366 | .04956 | −.03517 |
| .08254 | .05271 | .07336 | −.04253 |
| .11172 | .06122 | .10140 | −.04903 |
| .14466 | .06904 | .13345 | −.05456 |
| .18104 | .07607 | .16927 | −.05902 |
| .22050 | .09219 | .20852 | −.06236 |
| .26262 | .08729 | .25097 | −.06455 |
| .30696 | .09133 | .29590 | −.06560 |
| .35305 | .09423 | .34317 | −.06553 |
| .40035 | .09591 | .39222 | −.06437 |
| .44835 | .09628 | .44252 | −.06218 |
| .49650 | .09519 | .49354 | −.05900 |
| .54446 | .09236 | .54470 | −.05484 |
| .59211 | .09794 | .59560 | −.04961 |
| .63910 | .09191 | .64599 | −.04352 |
| .68492 | .07470 | .69534 | −.03695 |
| .72923 | .00619 | .74302 | −.03012 |
| .77203 | .05665 | .79956 | −.02310 |
| .91306 | .04674 | .83169 | −.01624 |
| .85171 | .03708 | .87195 | −.01019 |
| .88727 | .02810 | .90813 | −.00543 |
| .91903 | .02015 | .93957 | −.00215 |
| .94621 | .01336 | .96523 | −.00032 |
| .96834 | .00765 | .98428 | .00031 |
| .98521 | .00326 | .99603 | .00018 |
| .99615 | .00074 | 1.00000 | .00000 |
| 1.00000 | .00000 | | |

Figure 10:
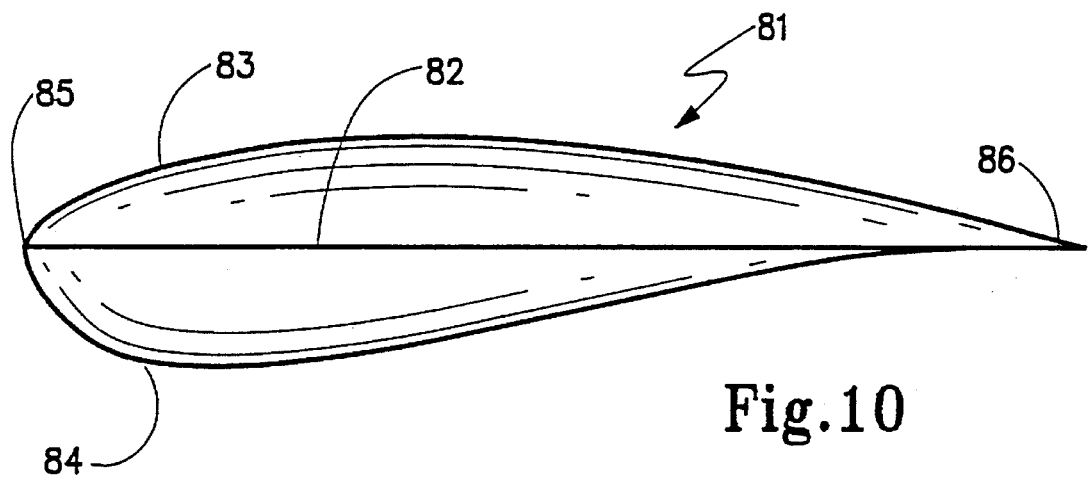
FIG. 10 is a profile of a third family airfoil for the root region of a blade 1 to 5 meters in size in accordance with the instant invention.

FIG. 10 is a profile of another third family airfoil 81 in accordance with the instant invention. This airfoil is de,signed for a particular region, namely the root region of the blade. This region typically extends from 20% to 50% from the center of rotation. The airfoil has specific geometric tailoring to achieve a maximum lift coefficient of 1.2 at a Reynolds number of 400,000. This maximum lift coefficient will also be largely insensitive to roughness effects.

The upper surface of the airfoil is shown at 83 and the lower surface at 84. The leading edge is at 85 and the trailing edge at 86. The airfoil has a thickness of 21%.

The specific geometric tailoring of the airfoil 81 of FIG. 10 is also given in the form of the following table of coordinates. The x/c values are dimensionless locations on the blade chord line 82. They are given for both the upper and lower surfaces. The y/c values are the dimensionless heights from the chord line 82 to points either on the upper or lower surface.

| Upper Surface | | Lower Surface | |
|---|---|---|---|
| x/c | y/c | x/c | y/c |
| 0.00003 | 0.00081 | 0.00014 | −0.00185 |
| .00052 | .00340 | .00077 | −.00476 |
| .00153 | .00610 | .00235 | −.00931 |
| .00585 | .01332 | .00997 | −.02397 |
| .01696 | .02508 | .02096 | −.04105 |
| .03294 | .03694 | .03398 | −.05895 |
| .05346 | .04855 | .04870 | −.07607 |
| .07823 | .05963 | .06519 | −.09082 |
| .10699 | .06996 | .08455 | −.10183 |
| .13942 | .07934 | .10818 | −.10927 |
| .17517 | .08761 | .13619 | −.11396 |
| .21386 | .09460 | .16818 | −.11608 |
| .25507 | .10012 | .20392 | −.11564 |
| .29844 | .10396 | .24321 | −.11269 |
| .34365 | .10598 | .28583 | −.10736 |
| .39036 | .10609 | .33155 | −.09985 |
| .43836 | .10427 | .38011 | −.09045 |
| .48734 | .10071 | .43115 | −.07953 |
| .53687 | .09561 | .48426 | −.06755 |
| .58650 | .08921 | .53893 | −.05503 |
| .63576 | .08174 | .59453 | −.04251 |
| .68411 | .07347 | .65031 | −.03058 |
| .73103 | .06471 | .70542 | −.01977 |
| .77594 | .05573 | .75888 | −.01054 |
| .81824 | .04683 | .80962 | −.00327 |
| .85734 | .03824 | .85655 | .00182 |
| .89261 | .03018 | .89852 | .00469 |
| .92348 | .02280 | .93446 | .00545 |
| .94935 | .01608 | .96322 | .00441 |
| .97006 | .00985 | .98383 | .00244 |
| .98585 | .00451 | .99600 | .00069 |
| .99627 | .00109 | 1.00000 | .00000 |
| 1.00000 | .00000 | | |

The airfoils of the instant invention are part of three airfoil families which encompass blade airfoils in a range from 16%–24% thickness, with Reynolds number in a range from 400,000 to 4,000,000 with a maximum lift coefficient of 1.0 to 1.7. Also, by using the airfoil families as described, a particular blade may be designed to achieve more effective peak power control that is largely insensitive to roughness effects.

The disclosed airfoils were specifically designed for fixed-pitch, stall-regulated, horizontal-axis wind turbines, but it is contemplated that they can be used with variable-pitch or variable-speed wind turbines.

Also, although the airfoils were specifically designed to reduce roughness sensitivity, it is contemplated the effects of erosion of 10 to 30 thousandths of an inch can also have a reduced effect with the airfoils of the instant invention.

Although the invention has been shown and described with respect to a preferred embodiment, it should be understood by those skilled in the art that various changes, omissions, and additions in the form and detail thereof may be made therein without departing from the spirit and scope of the claimed invention.

We claim:

1. A family of airfoils for a blade of a wind turbine, wherein said blade has a root region, an outboard region and a tip region, said family of airfoils comprising:

an airfoil in the root region of said blade having a Reynolds number of 2,500,000, an airfoil in the outboard region of said blade having a Reynolds number of 4,000,000, and an airfoil in the tip region of said blade having a Reynolds number of 3,000,000, and wherein each airfoil is characterized by a maximum lift coefficient that is largely insensitive to roughness effects.

2. The family of airfoils of claim 1 wherein said airfoil in the tip region has a maximum lift coefficient of 1.1, said airfoil in the outboard region has a maximum lift coefficient of 1.2 and said airfoil in the root region has a maximum lift coefficient of 1.7.

3. The family of airfoils of claim 2 wherein said blade is from 15 to 25 meters in length.

4. The family of airfoils of claim 2 wherein said tip region airfoil has a thickness of about 16%, said outboard region airfoil has a thickness of about 21% and said root region airfoil has a thickness of about 24%.

5. A family of airfoils for a blade of a wind turbine wherein said blade has a tip region and a root region, said family of airfoils comprising an airfoil for said tip region, and an airfoil for said root region wherein said tip region airfoil has a Reynolds number of 600,000 and said root region airfoil has a Reynolds number of 400,000.

6. The family of airfoils of claim 5 comprising said airfoil in the tip region having a maximum lift coefficient of 1.0, and said airfoil in the root region having a maximum lift coefficient of 1.2.

7. The family of airfoils of claim 6 wherein said blade is from 1 to 5 meters in length.

8. The family of airfoils of claim 6 wherein said tip region airfoil has a thickness of about 16% and said root region airfoil has a thickness of about 21%.

9. A family of airfoils for a blade of a wind turbine wherein said blade has a tip region, an outboard region, and a root region, said family of airfoils comprising an airfoil for said tip region, an airfoil for said outboard region, and an airfoil for said root region, wherein said tip region airfoil has a Reynolds number of 1,300,000, said outboard region airfoil has a Reynolds number of 1,000,000, and said root region airfoil has a Reynolds number of 800,000.

10. The family of airfoils of claim 9 wherein said tip region airfoil has a maximum lift coefficient of 1.1, said outboard region airfoil has a maximum lift coefficient of 1.2, and said root region airfoil has a maximum lift coefficient of 1.4.

11. The family of airfoils of claim 10 wherein said blade is from 5 to 10 meters in length.

12. The family of airfoils of claim 10 wherein said tip region airfoil is about 16% thickness, said outboard region airfoil is about 21% thickness, and said root region airfoil is about 24% thickness.

13. An airfoil for a blade of a wind turbine wherein said blade has a tip region and the airfoil is in the tip region, said airfoil having a cross-sectional shape characterized by a thickness of about 16% and a maximum lift coefficient in a range from 1.0 to 1.1 to be substantially insensitive to roughness, and a Reynolds number in a range from 600,000 to 3,000,000.

14. The tip region airfoil of claim 13 wherein said blade is 15 to 25 meters in length and said airfoil has a Reynolds number of 3,000,000.

15. The tip region airfoil of claim 14 wherein the maximum lift coefficient is 1.1.

16. The tip region airfoil of claim 13 wherein said blade is 1 to 5 meters in length and said airfoil has a Reynolds number of 600,000.

17. The tip region airfoil of claim 16 wherein the maximum lift coefficient is 1.0.

18. The tip region airfoil of claim 13 wherein said blade is 5 to 10 meters in length and said airfoil has a Reynolds number of 1,300,000.

19. The tip region airfoil of claim 18 wherein the airfoil has a maximum lift coefficient of 1.1.

20. An airfoil for a blade of a wind turbine wherein said blade has a tip region and said airfoil is in the tip region, wherein said airfoil comprises an upper surface and a lower surface and a blade chord line wherein x/c values are dimensionless locations on the blade chord line and y/c values are dimensionless heights from the chord line to points on the upper or lower surface, wherein said values correspond substantially to the following table for said surfaces:

| Upper Surface | | Lower Surface | |
| --- | --- | --- | --- |
| x/c | y/c | x/c | y/c |
| 0.00010 | 0.00117 | 0.00001 | −0.00038 |
| .00036 | .00243 | .00029 | −.00169 |
| .00443 | .01001 | .00107 | −.00285 |
| .01313 | .01841 | .00235 | −.00398 |
| .02661 | .02718 | .00925 | −.00755 |
| .00479 | .03620 | .02330 | −.01157 |
| .06748 | .04533 | .04329 | −.01517 |
| .09441 | .05445 | .06911 | −.01857 |
| .12517 | .06342 | .10030 | −.02217 |
| .15941 | .07203 | .13611 | −.02613 |
| .19672 | .08010 | .17584 | −.03033 |
| .23667 | .08746 | .21884 | −.03464 |
| .27883 | .09392 | .26447 | −.03891 |
| .32273 | .09934 | .31211 | −.04294 |
| .36790 | .10355 | .36113 | −.04655 |
| .41384 | .10640 | .41092 | −.04952 |
| .46005 | .10771 | .46088 | −.05162 |
| .50602 | .10727 | .51041 | −.05260 |
| .55134 | .10473 | .55893 | −.05200 |
| .59585 | .09969 | .60634 | −.04913 |
| .63984 | .09191 | .65317 | −.04392 |
| .68387 | .08192 | .69967 | −.03701 |
| .79779 | .07087 | .74564 | −.02924 |
| .77085 | .05960 | .79051 | −.02150 |
| .81221 | .04865 | .83342 | −.01447 |
| .85106 | .03842 | .87341 | −.00861 |
| .88653 | .02908 | .90948 | −.00420 |
| .91803 | .02060 | .94065 | −.00132 |
| .94528 | .01309 | .96599 | .00013 |
| .96792 | .00701 | .98470 | .00046 |
| .98522 | .00281 | .99615 | .00020 |
| .99621 | .00061 | 1.00000 | .00000 |
| 1.00000 | .00000 | | |

21. An airfoil for a blade of a wind turbine wherein said blade has a tip region and said airfoil is in the tip region, wherein said airfoil comprises an upper surface and a lower surface and a blade chord line wherein x/c values are dimensionless locations on the blade chord line and y/c values are dimensionless heights from the chord line to points on the upper or lower surface, wherein said values correspond substantially to the following table for said surfaces:

| Upper Surface | | Lower Surface | |
|---|---|---|---|
| x/c | y/c | x/c | y/c |
| 0.00013 | 0.00133 | 0.00001 | −0.00041 |
| .00364 | .00910 | .00032 | −.00178 |
| .01172 | .01811 | .00117 | −.00300 |
| .02425 | .02758 | .00258 | −.00423 |
| .04120 | .03708 | .01207 | −.00946 |
| .106255 | .04637 | .02754 | −.01514 |
| .08815 | .05531 | .04834 | −.02097 |
| .11774 | .06379 | .07403 | −.02684 |
| .15102 | .07167 | .10419 | −.03260 |
| .18764 | .07884 | .13841 | −.03813 |
| .22719 | .08520 | .17622 | −.04330 |
| .26923 | .09063 | .21715 | −.04798 |
| .31330 | .09501 | .26072 | −.05203 |
| .35891 | .09825 | .30638 | −.05533 |
| .40555 | .10022 | .35360 | −.05772 |
| .45272 | .10079 | .40183 | −.05903 |
| .49988 | .09978 | .45050 | −.05900 |
| .54666 | .09688 | .49923 | −.05721 |
| .59300 | .09196 | .54807 | −.05340 |
| .63875 | .08518 | .59707 | −.04785 |
| .68373 | .07668 | .64604 | −.04093 |
| .72795 | .06688 | .69476 | −.03316 |
| .77109 | .05656 | .74277 | −.02532 |
| .81244 | .04635 | .78923 | −.01803 |
| .85123 | .03666 | .83325 | −.01172 |
| .88668 | .02775 | .87388 | −.00668 |
| .91818 | .01962 | .91020 | −.00304 |
| .94544 | .01242 | .94132 | −.00077 |
| .96806 | .00661 | .96644 | .00029 |
| .98531 | .00263 | .98490 | .00047 |
| .99624 | .00057 | .99620 | .00020 |
| 1.00000 | .00000 | 1.00000 | .00000 |

22. An airfoil for a blade of a wind turbine wherein the blade has a tip region and said airfoil is in the tip region, wherein said airfoil comprises an upper surface and a lower surface and a blade chord line wherein x/c values are dimensionless locations on the blade chord line and y/c values are dimensionless heights from the chord line to points on the upper or lower surface, wherein said values correspond substantially to the following table for said surfaces:

| Upper Surface | | Lower Surface | |
|---|---|---|---|
| x/c | y/c | x/c | y/c |
| 0.00012 | 0.00132 | 0.00002 | −0.00057 |
| .00064 | .00336 | .00042 | −.00244 |
| .00176 | .00603 | .00126 | −.00440 |
| .00861 | .01510 | .00530 | −.01010 |
| .02029 | .02464 | .01536 | −.01866 |
| .03661 | .03425 | .03018 | −.02713 |
| .05742 | .04366 | .04956 | −.03517 |
| .08254 | .05271 | .07336 | −.04253 |
| .11172 | .06122 | .10140 | −.04903 |
| .14466 | .06904 | .13345 | −.05456 |
| .18104 | .07607 | .16927 | −.05902 |
| .22050 | .08218 | .20852 | −.06236 |
| .26262 | .08729 | .25087 | −.06455 |
| .30696 | .09133 | .29590 | −.06560 |
| .35305 | .09423 | .34317 | −.06553 |
| .40035 | .09591 | .39222 | −.06437 |
| .44835 | .09628 | .44252 | −.06218 |
| .49650 | .09518 | .49354 | −.05900 |
| .54446 | .09236 | .54470 | −.05484 |
| .59211 | .08784 | .59560 | −.04961 |
| .63910 | .08191 | .64598 | −.04352 |
| .68492 | .07470 | .69534 | −.03695 |
| .72923 | .06619 | .74302 | −.03012 |
| .77203 | .05665 | .78856 | −.02310 |
| .81306 | .04674 | .83169 | −.01624 |

| Upper Surface | | Lower Surface | |
|---|---|---|---|
| x/c | y/c | x/c | y/c |
| .85171 | .03708 | .87185 | −.01019 |
| .88727 | .02810 | .90813 | −.00543 |
| .91903 | .02015 | .93957 | −.00215 |
| .94621 | .01336 | .96523 | −.00032 |
| .96834 | .00765 | .98428 | .00031 |
| .98521 | .00326 | .99603 | .00018 |
| .99615 | .00074 | .00000 | .00000 |
| 1.00000 | .00000 | | |

23. An airfoil for a blade of a wind turbine wherein said blade has an outboard region and said airfoil is in said outboard region, said airfoil having a cross-sectional shape characterized by a thickness of about 21%, a maximum lift coefficient of 1.2, and a Reynolds number from 1,000,000–4,000,000.

24. The outboard region airfoil of claim 23 wherein said blade is 15 to 25 meters in length and said airfoil has a Reynolds number of 4,000,000.

25. The outboard region airfoil of claim 23 wherein said blade is 5 to 10 meters in length and said airfoil has a Reynolds number of 1,000,000.

26. An airfoil for a blade of a wind turbine wherein said blade has an outboard region and said airfoil is in said outboard region, wherein said airfoil comprises an upper surface and a lower surface and a blade chord line wherein x/c values are dimensionless locations on the blade chord line and y/c values are dimensionless heights from the chord line to points on the upper or lower surface, wherein said values correspond substantially to the following table for said surfaces:

| Upper Surface | | Lower Surface | |
|---|---|---|---|
| x/c | y/c | x/c | y/c |
| 0.00000 | 0.00009 | 0.00019 | −0.00158 |
| .00023 | .00198 | .00093 | −.00314 |
| .00302 | .00863 | .00220 | −.00475 |
| .01099 | .01818 | .00368 | −.00620 |
| .02379 | .02836 | .01412 | −.01294 |
| .04125 | .03888 | .03050 | −.01988 |
| .06315 | .04950 | .05260 | −.02698 |
| .08920 | .06005 | .08019 | −.03456 |
| .11901 | .07033 | .11247 | −.04309 |
| .15222 | .08009 | .14831 | −.05249 |
| .18843 | .08912 | .18682 | −.06232 |
| .22723 | .09720 | .22730 | −.07231 |
| .26818 | .10411 | .26846 | −.08222 |
| .31082 | .10965 | .30881 | −.09050 |
| .35467 | .11360 | .34877 | −.09483 |
| .39923 | .11569 | .39005 | −.09470 |
| .44398 | .11547 | .43340 | −.09089 |
| .48900 | .11217 | .47890 | −.08411 |
| .53503 | .10591 | .52644 | −.07515 |
| .58217 | .09767 | .57555 | −.06477 |
| .62982 | .08824 | .62567 | −.05360 |
| .67730 | .07811 | .67615 | −.04229 |
| .72392 | .06774 | .72622 | −.03146 |
| .76893 | .05749 | .77501 | −.02165 |
| .81158 | .04763 | .82154 | −.01331 |
| .85113 | .03838 | .86477 | −.00676 |
| .88685 | .02976 | .90364 | −.00216 |
| .91827 | .02165 | .93713 | .00052 |
| .94534 | .01412 | .96426 | .00150 |
| .96784 | .00776 | .98412 | .00118 |
| .98512 | .00320 | .99605 | .00038 |
| .99617 | .00072 | 1.00000 | .00000 |
| 1.00000 | .00000 | | |

27. An airfoil for a blade of a wind turbine wherein said blade has an outboard region and said airfoil is in said outboard region, wherein said airfoil comprises an upper surface and a lower surface and a blade chord line wherein x/c values are dimensionless locations on the blade chord line and y/c values are dimensionless heights from the chord line to points on the upper or lower surface, wherein said values correspond substantially to the following table for said surfaces:

| Upper Surface | | Lower Surface | |
|---|---|---|---|
| x/c | y/c | x/c | y/c |
| 0.00002 | 0.00077 | 0.00006 | −0.00125 |
| .00101 | .00556 | .00056 | −.00298 |
| .00673 | .01572 | .00177 | −.00455 |
| .01719 | .02663 | .00372 | −.00622 |
| .03213 | .03768 | .00891 | −.00986 |
| .05143 | .04852 | .02445 | −.02021 |
| .07486 | .05890 | .04415 | −.03323 |
| .10216 | .06858 | .06692 | −.04746 |
| .13302 | .07733 | .09234 | −.06201 |
| .16709 | .08491 | .11997 | −.07614 |
| .20398 | .09099 | .14948 | −.08914 |
| .24355 | .09516 | .18049 | −.10033 |
| .28581 | .09736 | .21265 | −.10864 |
| .33053 | .09777 | .24658 | −.11280 |
| .37732 | .09651 | .28355 | −.11284 |
| .42580 | .09369 | .32385 | −.10966 |
| .47552 | .08949 | .36718 | −.10375 |
| .52602 | .08411 | .41332 | −.09557 |
| .57678 | .07780 | .46189 | −.08562 |
| .62723 | .07078 | .51244 | −.07440 |
| .67679 | .06331 | .56446 | −.06247 |
| .72481 | .05561 | .61728 | −.05039 |
| .77067 | .04792 | .67018 | −.03869 |
| .81370 | .04039 | .72231 | −.02789 |
| .85327 | .03316 | .77274 | −.01843 |
| .88875 | .02622 | .82050 | −.01064 |
| .91979 | .01940 | .86454 | −.00473 |
| .94642 | .01282 | .90387 | −.00075 |
| .96851 | .00712 | .93753 | .00141 |
| .98545 | .00295 | .96464 | .00197 |
| .99626 | .00066 | .98437 | .00136 |
| 1.00000 | .00000 | .99613 | .00042 |
| | | 1.00000 | .00000 |

28. An airfoil for a blade of a wind turbine wherein said blade has a root region and the airfoil is in said root region, said airfoil having a cross-sectional shape characterized by a thickness in a range from about 21% to 24% and a maximum lift coefficient in a range from 1.2 to 1.7 to be substantially insensitive to roughness and a Reynolds number from 400,000 to 2,500,000.

29. The root region airfoil of claim 28 wherein said blade is 15 to 25 meters in length and said airfoil has a Reynolds number of 2,500,000.

30. The root region airfoil of claim 29 wherein the maximum lift coefficient is 1.7 to be largely insensitive to roughness.

31. The root region airfoil of claim 28 wherein said blade is 1 to 5 meters in length and said airfoil has a Reynolds number of 400,000.

32. The root region airfoil of claim 31 wherein the maximum lift coefficient is 1.2.

33. The root region airfoil of claim 28 wherein said blades are 5 to 10 meters in length and said airfoil has a Reynolds number of 800,000.

34. The root region airfoil of claim 33 wherein the maximum lift coefficient is 1.4.

35. An airfoil for a blade of a wind turbine wherein said blade has a root region and said airfoil is in the root region wherein said airfoil comprises an upper surface and a lower surface and a blade chord line wherein x/c values are dimensionless locations on the blade chord line and y/c values are dimensionless heights from the chord line to points on the upper or lower surface, wherein said values correspond substantially to the following table for said surfaces:

| Upper Surface | | Lower Surface | |
|---|---|---|---|
| x/c | y/c | x/c | y/c |
| 0.00012 | 0.00170 | 0.00003 | −0.00087 |
| .00066 | .00442 | .00048 | −.00341 |
| .00374 | .01205 | .00141 | −.00608 |
| .01259 | .02437 | .00328 | −.00985 |
| .02619 | .03717 | .01232 | −.02157 |
| .04424 | .05009 | .02631 | −.03391 |
| .06647 | .06284 | .04486 | −.04650 |
| .09256 | .07518 | .06764 | −.05923 |
| .12213 | .08681 | .09404 | −.07200 |
| .15482 | .09745 | .12331 | −.08444 |
| .19023 | .10678 | .15489 | −.09598 |
| .22797 | .11449 | .18823 | −.10622 |
| .26760 | .12006 | .22238 | −.11444 |
| .30915 | .12285 | .25700 | −.11893 |
| .35312 | .12287 | .29323 | −.11847 |
| .39944 | .12073 | .33232 | −.11328 |
| .44760 | .11690 | .37488 | −.10412 |
| .49702 | .11165 | .42102 | −.09200 |
| .54711 | .10527 | .47043 | −.07786 |
| .59727 | .09798 | .52267 | −.06258 |
| .64685 | .09003 | .57709 | −.04706 |
| .69521 | .08161 | .63288 | −.03217 |
| .74169 | .07292 | .68903 | −.01872 |
| .78569 | .06409 | .74437 | −.00740 |
| .82657 | .05526 | .79758 | .00128 |
| .86377 | .04651 | .84726 | .00704 |
| .89672 | .03779 | .89200 | .00985 |
| .92522 | .02885 | .93046 | .00996 |
| .94958 | .01983 | .96144 | .00780 |
| .96996 | .01155 | .98351 | .00422 |
| .98590 | .00509 | .99606 | .00113 |
| .99633 | .00122 | 1.00000 | .00000 |
| 1.00000 | .00000 | | |

36. An airfoil for a blade of a wind turbine wherein said blade has a root region and said airfoil is in the root region wherein said airfoil comprises an upper surface and a lower surface and a blade chord line wherein x/c values are dimensionless locations on the blade chord line and y/c values are dimensionless heights from the chord line to points on the upper or lower surface, wherein said values correspond substantially to the following table for said surfaces:

| Upper Surface | | Lower Surface | |
|---|---|---|---|
| x/c | y/c | x/c | y/c |
| 0.00004 | 0.00203 | .00001 | −.00076 |
| .00037 | .00550 | .00243 | −.01654 |
| .00110 | .00874 | .00887 | −.03393 |
| .00234 | .01186 | .01876 | −.05219 |
| .00405 | .01499 | .03170 | −.07058 |
| .01212 | .02520 | .04745 | −.08838 |
| .02684 | .03773 | .06576 | −.10493 |
| .04636 | .04980 | .08643 | −.11944 |
| .07040 | .06118 | .10959 | −.13110 |
| .09865 | .07171 | .13548 | −.13943 |
| .13075 | .08122 | .16433 | −.14399 |
| .16633 | .08955 | .19663 | −.14462 |
| .20495 | .09652 | .23262 | −.14170 |
| .24618 | .10190 | .27216 | −.13552 |
| .28970 | .10538 | .31514 | −.12635 |
| .33539 | .10684 | .36142 | −.11455 |
| .38300 | .10642 | .41081 | −.10062 |
| .43214 | .10431 | .46300 | −.08518 |
| .48234 | .10066 | .51756 | −.06893 |
| .53312 | .09566 | .57389 | −.05266 |
| .58396 | .08955 | .63119 | −.03717 |

| Upper Surface | | Lower Surface | |
|---|---|---|---|
| x/c | y/c | x/c | y/c |
| .63429 | .08254 | .68850 | −.02322 |
| .68353 | .07489 | .74465 | −.01147 |
| .73105 | .06680 | .79836 | −.00239 |
| .77624 | .05851 | .84823 | .00376 |
| .81848 | .05016 | .89291 | .00700 |
| .85715 | .04192 | .93109 | .00763 |
| .89164 | .03377 | .96165 | .00615 |
| .92166 | .02552 | .98346 | .00340 |
| .94740 | .01733 | .99601 | .00093 |
| .96886 | .00996 | 1.00000 | .00000 |
| .98550 | .00432 | | |
| .99625 | .00102 | | |
| 1.00000 | .00000 | | |

37. An airfoil for a blade of a wind turbine wherein said blade has a root region and said airfoil is in the root region where said airfoil comprises an upper surface and a lower surface and a blade chord line wherein x/c values are dimensionless locations on the blade chord line and y/c values are dimensionless heights from the chord line to points on the upper or lower surface, wherein said values correspond substantially to the following table for said surfaces:

| Upper Surface | | Lower Surface | |
|---|---|---|---|
| x/c | y/c | x/c | y/c |
| 0.00003 | 0.00081 | 0.00014 | −0.00185 |
| .00052 | .00340 | .00077 | −.00476 |
| .00153 | .00610 | .00235 | −.00931 |
| .00585 | .01332 | .00997 | −.02397 |
| .01696 | .02508 | .02096 | −.04105 |
| .03294 | .03694 | .03398 | −.05895 |
| .05346 | .04855 | .04870 | −.07607 |
| .07823 | .05963 | .06519 | −.09082 |
| .10699 | .06996 | .08455 | −.10183 |
| .13942 | .07934 | .10818 | −.10927 |
| .17517 | .08761 | .13619 | −.11396 |
| .21386 | .09460 | .16818 | −.11608 |
| .25507 | .10012 | .20392 | −.11564 |
| .29844 | .10396 | .24321 | −.11269 |
| .34365 | .10598 | .28583 | −.10736 |
| .39036 | .10609 | .33155 | −.09985 |
| .43836 | .10427 | .38011 | −.09045 |
| .48734 | .10071 | .43115 | −.07953 |
| .53687 | .09561 | .48426 | −.06755 |
| .58650 | .08921 | .53893 | −.05503 |
| .63576 | .08174 | .59453 | −.04251 |
| .68411 | .07347 | .65031 | −.03058 |
| .73103 | .06471 | .70542 | −.01977 |
| .77594 | .05573 | .75888 | −.01054 |
| .81824 | .04683 | .80962 | −.00327 |
| .85734 | .03824 | .85655 | .00182 |
| .89261 | .03018 | .89852 | .00469 |
| .92348 | .02280 | .93446 | .00545 |
| .94935 | .01608 | .96322 | .00441 |
| .97006 | .00985 | .98383 | .00244 |
| .98585 | .00451 | .99600 | .00069 |
| .99627 | .00109 | 1.00000 | .00000 |
| 1.00000 | .00000 | | |

* * * * *